Patented Jan. 14, 1947

2,414,374

UNITED STATES PATENT OFFICE 2,414,374

METAL PHTHALOCYANINES HAVING AMINO- OR NITRO-PHENYL GROUPS ATTACHED TO THEIR AROMATIC NUCLEI BY >O, >CO, OR >SO$_2$

Norman Hulton Haddock, Alexander Parkinson, and George Alston Rowe, Blackley, Manchester, England, assignors to Imperial Chemical Industries Limited, a corporation of Great Britain No Drawing. Application August 15, 1944, Serial No. 549,626. In Great Britain September 20, 1943

11 Claims. (Cl. 260—314.5)

This invention relates to the manufacture of new metal phthalocyanine derivatives, being more particularly concerned with metal phthalocyanines having aminophenyl groups attached to their aromatic nuclei by means of particular links.

It is known from British specification No. 529,847 (I. C. I. et al.) that tetra-aminophthalocyanines are readily diazotised and are useful as intermediates namely, diazo components, in the preparation of colouring matters. That is to say, the phthalocyanine diazonium salts may be prepared and coupled with azo coupling components. But diazonium salts regarded as a class of chemical compounds are liable to decompose, particularly at raised temperatures and even at room temperature or 0° C. Though there is variation in respect of stability from member to member of the class under consideration, it may be said that diazonium salts in general are rather unstable. Nor do diazonium salts derived from aminophthalocyanines form any exception to this rule. Consequently in coupling them decomposition tends to occur as it does in azo couplings in general, the degree of decomposition depending especially on the temperature. Further the decomposition products thus arising are apt to vitiate the resulting azo colouring matter and so may impair its technically useful properties. Accordingly the less the decomposition of the diazonium salt the better. We have now found that if the amino groups instead of being directly attached to the phthalocyanine molecule are carried on pendant phenyl groups, themselves connected to the phthalocyanine molecule by various linking atoms or groups of atoms, then the stability of the corresponding diazonium salts is notably greater.

Accordingly the present invention relates to a process for the manufacture of new metal phthalocyanines carrying four aminophenyl groups nuclearly attached by one of the linking atom and groups of atoms: —CO—, —SO$_2$— and —O—, which comprises heating a phthalic acid derivative which is phthalic acid carrying a nitrophenyl group attached by one of the aforesaid linking atom and groups of atoms, or the corresponding derivative of phthalic anhydride, phthalimide or phthalamide, together with urea and a substance containing a metal, and reducing the resulting phthalocyanine having four nitrophenyl groups linked to it.

In a preferred embodiment of the invention there is also present in the mixture of the phthalic acid derivative, urea and a substance containing a metal, a further ingredient which is a substance containing an element of the fifth or sixth group of the periodic table and having an atomic number between 15 and 23 or between 33 and 92 each inclusive, optionally in conjunction with boric acid.

As examples of the phthalic acid derivative which may be used as one of the starting materials are mentioned:

4-(m-nitrobenzoyl)-phthalic acid
4-(m-nitrophenylsulphonyl)-phthalic acid
3-(p-nitrophenoxy)-phthalic acid
4-(p-nitrophenoxy)-phthalic acid
4-(p-nitrobenzoyl)-phthalimide
4-(m-nitrobenzoyl)-phthalamide
4-(o-nitrophenylsulphonyl)-phthalic acid
4-(p-nitrobenzoyl)-phthalic acid
4-(p-nitrobenzoyl)-phthalic anhydride
4-(p-nitrophenylsulphonyl)-phthalic acid
4-(p-nitrophenylsulphonyl)-phthalic anhydride.

The substance containing a metal used in the present invention may be, for instance cupric chloride, nickelous chloride, cobaltous chloride or manganese chloride.

The phthalocyanines having nitrophenyl groups linked to them which are obtained as intermediate products in carrying out the present process, are conveniently reduced by, for instance, sodium hydrogen sulphide, stannous chloride or sodium hydrosulphite.

The chemical reactions underlying the stage of the above process involving phthalocyanine formation, that is, the production of the phthalocyanines having nitrophenyl groups linked to them, are conveniently effected by heating at 135° C.–200° C. (and preferably at the lowest temperature at which the phthalocyanine is produced, which temperature may be recognised by a change of colour of the mixture from brown to greenish blue). Moreover the reactions in question are desirably facilitated by substances containing elements of the fifth or sixth group of the periodic table having atomic numbers as above defined. As such substances may be employed, for example, sodium molybdate, ammonium molybdate, diammonium hydrogen phosphate, ammonium vanadate or arsenious oxide, either alone or in combination. Boric acid can also be added if desired. Conveniently the urea may serve as a flux or diluent if sufficient is taken, but other diluents can be used, e. g. o-dichlorobenzene or α-chloronaphthalene.

The following examples in which the parts are

Example 1

125 parts of 4-(p-nitrobenzoyl)-phthalic acid, 357 parts of urea, 20 parts of anhydrous cupric chloride, 7.5 parts of ammonium molybdate and 15 parts of boric acid are mixed and finely powdered. The mixture is added to 770 parts of o-dichlorobenzene and the resulting mixture is heated at 145° C. with stirring, for 4 hours. Copper tetra-4-(p-nitrobenzoyl)-phthalocyanine is formed as a dark green suspension. The mixture is filtered hot, and the solid product extracted with boiling alcohol. The crude copper tetra-4-(p-nitrobenzoyl)-phthalocyanine is then extracted with boiling water, hot 2N-hydrochloric arid, hot 2N ammonia, hot 2N sodium hydroxide solution and boiling water. The product is dried and then extracted with boiling acetone. The copper tetra-4-(p-nitrobenzoyl)-phthalocyanine so obtained is dissolved in 550 parts of concentrated sulphuric acid at 5° C.–10° C. and the green solution poured into 5500 parts of cold water. The suspended copper tetra-4-(p-nitrobenzoyl)-phthalocyanine is filtered off, and the resulting paste washed free from acid and inorganic salts.

Copper tetra-4-(p-nitrobenzoyl)-phthalocyanine in the form of an aqueous paste, made as described above and containing 22.8 parts of dry material, is milled and suspended in 243 parts of water. Reduction is effected by the slow addition of 34.8 parts of sodium hydrogen sulphide as 30% aqueous solution. The mixture is stirred for 5 hours, ground in a ball mill for 10 hours and then the copper tetra-(4)-(p-aminobenzoyl)-phthalocyanine is filtered off and washed free from alkali and sulphide. It may be dried to form a greenish blue solid but is conveniently kept in the form of an aqueous paste for the purpose of diazotisation which is readily effected by the action of hydrochloric acid and sodium nitrite.

Example 2

10.5 parts of 4-(p-nitrophenylsulphonyl)-phthalic acid, 27 parts of urea, 1.5 parts of anhydrous cupric chloride and 0.5 parts of ammonium molybdate is heated for 3 hours at 140°–145° C. The product is extracted with boiling water, hot 2N hydrochloric acid, hot 2N ammonia and boiling water and then dried. The product is then extracted with boiling acetone. The crude copper tetra-(4)-(p-nitrophenylsulphonyl)-phthalocyanine is dissolved in 40 parts of concentrated sulphuric acid and poured into 400 parts of cold water. The suspended copper tetra-(4)-(p-nitrophenylsulphonyl)-phthalocyanine is filtered off, and the paste washed free from acid and inorganic salts.

Copper tetra-(4)-(p-nitrophenylsulphonyl)-phthalocyanine in the form of an aqueous paste, made as described above and containing 4 parts of dry material, is stirred with water so as to form 50 parts of an aqueous suspension. This is added to 17.7 parts of concentrated hydrochloric acid. Reduction is carried out by the slow addition of 12 parts of crystalline stannous chloride dissolved in 25 parts of water. The mixture is stirred for 16 hours at room temperature, filtered and the product washed with dilute hydrochloric acid until free from tin salts. The product is then washed acid-free with water, washed with dilute ammonia solution and then washed alkali-free with water. The copper tetra-(4)-(p-aminophenylsulphonyl)-phthalocyanine thus obtained can be dried to form a greenish blue solid but may conveniently be preserved as an aqueous paste for the purpose of diazotisation and coupling with azo coupling components.

Example 3

60 parts of 4-(p-nitrobenzoyl)-phthalic anhydride, 182 parts of urea, 10.2 parts of anhydrous cupric chloride and 3.9 parts of ammonium molybdate are mixed and finely powdered. The powdered mass is added to 390 parts of o-dichlorobenzene and the resulting mixture heated at 145°–150° C., with stirring, for 3 hours. Copper tetra-(4)-(p-nitrobenzoyl)-phthalocyanine is formed as a dark green suspension. The suspension is filtered and the residue extracted with boiling alcohol. The crude copper tetra-(4)-(p-nitrobenzoyl)-phthalocyanine is then extracted with boiling water, hot 2N hydrochloric acid, hot 2N sodium hydroxide solution, and washed free from alkali with hot water. The product is dried and then extracted with boiling acetone. The copper tetra-(4)-(p-nitrobenzoyl)-phthalocyanine so obtained is dissolved in 370 parts of concentrated sulphuric acid at 5-10° C.; the solution is filtered from undissolved impurities and then poured into 3700 parts of cold water, with good agitation. The fine-suspended copper tetra-(4)-(p-nitrobenzoyl)-phthalocyanine is filtered off, and the resulting paste washed free from acid and inorganic salts.

Copper tetra-(4)-(p-nitrobenzoyl)-phthalocyanine in the form of an aqueous paste, made as described above and containing 32 parts of dry material, is milled and suspended in 630 parts of water. Reduction is effected by the slow addition of 49.2 parts of sodium hydrogen sulphide as an approximately 30% aqueous solution. The mixture is stirred for 5 hours, ball-milled for 12 hours and then the copper tetra-(4)-p-aminobenzoyl)-phthalocyanine is filtered off and washed free from alkali and sulphide with water. It may be dried to form a greenish blue solid but is conveniently kept in the form of an aqueous paste for the purpose of diazotisation and coupling with azo coupling components.

Example 4

50 parts of 4-(p-nitrobenzoyl)phthalic acid, 143 parts of urea, 7.8 parts of anhydrous nickel chloride, 3.2 parts of ammonium molybdate and 6.4 parts of boric acid are mixed and finely powdered. The powdered material is added to 450 parts of α-chloronaphthalene and the resulting mixture heated at 145°–150° C., with stirring, for 3 hours. The mixture is allowed to cool, filtered and the solid product extracted with boiling alcohol. The crude nickel tetra-(4)-(p-nitrobenzoyl)phthalocyanine is then extracted with boiling water, hot 2N hydrochloric acid, hot 2N sodium hydroxide solution, and washed free from alkali with hot water. The product is dried and then extracted with boiling acetone. The nickel tetra-(4)-(p-nitrobenzoyl)phthalocyanine is dissolved in 100 parts of concentrated sulphuric acid at 5° C.–10° C.; the solution is filtered from undissolved impurities and then poured into 1000 parts of cold water with vigorous agitation. The suspended nickel tetra-(4)-(p-nitrobenzoyl)phthalocyanine is filtered off and the resulting paste washed free from acid and inorganic salts.

Nickel tetra-(4)-(p-nitrobenzoyl)-phthalocyanine in the form of an aqueous paste, made as described above and containing 8.9 parts of dry material, is milled and suspended in 210 parts of water. Reduction is effected by the slow addition of 13.5 parts of sodium hydrogen sulphide as an approximately 30% aqueous solution. The mixture is stirred for 4 hours, ball-milled for 15 hours and then the nickel tetra-(4)-(p-aminobenzoyl)phthalocyanine is filtered off and washed free from alkali and sulphide. It may be dried to form a bluish green solid but is conveniently kept as an aqueous paste for use in diazotisation.

*Example 5*

40 parts of 4-(p-nitrobenzoyl)-phthalic anhydride, 121 parts of urea, 6.8 parts of anhydrous cupric chloride, 0.85 part of ammonium molybdate and 1.7 parts of boric acid are ground together. The mixture is stirred with 192 parts of α-chloronapthalene and heated to 120° C. and maintained thereat until the green colour has disappeared. The temperature is then slowly raised to 138° C. and held there for 2½ hours. A dark greenish blue suspension of copper tetra-(4)-(p - nitrobenzoyl) - phthalocyanine is produced. The suspension is allowed to cool. The phthalocyanine is filtered off, extracted successively with boiling ethanol, boiling water, hot 2N hydrochloric acid, hot 2N sodium hydroxide solution and again with boiling water. The product is dried and then extracted wtih boiling ethanol and dried.

28 parts of copper tetra-(4)-(p-nitrobenzoyl)-phthalocyanine thus obtained are dissolved in 280 parts of concentrated sulphuric acid at 5° C.–10° C. After filtration, the green solution is added slowly to 2800 parts of water with vigorous agitation. The copper tetra-(4)-(p-nitrobenzoyl)-phthalocyanine thrown down is filtered off and the resulting paste washed free from acid and inorganic salts.

The aqueous paste of copper tetra-(4)-(p-nitrobenzoyl)-phthalocyanine made as described above is stirred with 350 parts of 30% aqueous sodium hydrogen sulphide at 90° C.–95° C. for 5 hours. The mixture is thereupon ground in a ball mill at room temperature for 15 hours. The paste is diluted with an equal volume of saturated sodium chloride and filtered. The copper tetra-(4)-(p-aminobenzoyl) - phthalocyanine is then washed free from alkali, sulphide and sodium chloride and dried.

*Example 6*

Copper tetra-(4)-(p-nitrobenzoyl)-phthalocyanine in the form of an aqueous paste, made as described in Example 5 and containing 10 parts of dry material, is ground with 100 parts water to a suspension. 38 parts of concentrated hydrochloric acid followed by a solution of 41 parts of stannous chloride dihydrate in 61 parts of water are added. The mixture is stirred at 20° C. for 16 hours. The resulting copper tetra-(4)-(p-aminobenzoyl)-phthalocyanine is filtered off, washed with dilute hydrochloric acid until free from tin salts, washed with water until free from acid, digested with warm dilute ammonium hydroxide and then filtered off and washed with water until free from alkali and dried.

*Example 7*

40 parts of 4-(p-nitrophenylsulphonyl)-phthalic anhydride, 108 parts of urea, 6.1 parts of anhydrous cupric chloride, 0.78 part of ammonium molybdate and 1.6 parts of boric acid are ground together. The mixture is stirred with 192 parts of α-chloronaphthalene, and slowly heated to 120° C. This temperature is maintained until the green colour disappears. The temperature is then held at 138° C. for 2½ hours. A dark blue suspension of copper tetra-(4)-(p-nitrophenylsulphonyl)-phthalocyanine is produced. After cooling, the phthalocyanine is filtered off, extracted successively with boiling ethanol, boiling water, hot 2N hydrochloric acid, hot 2N soduim hydroxide solution, boiling water and boiling ethanol, and dried. 27 parts of copper tetra-(4)-(p-nitrophenylsulphonyl)-phthalocyanine thus obtained are dissolved in 270 parts of concentrated sulphuric acid at 5° C. The solution is filtered and then added slowly to 2700 parts of stirred water. The precipitated copper tetra-(4)-(p-nitrophenylsulphonyl)-phthalocyanine is filtered off and the resulting paste washed free from acid and inorganic salts.

The aqueous paste of copper tetra-(4)-(p-nitrophenylsulphonyl)-phthalocyanine made as described above is reduced to copper tetra-(4)-(p-aminophenylsulphonyl)-phthalocyanine with sodium hydrogen sulphide as described in the latter part of Example 5 in respect of copper tetra-(4)-(p-nitrobenzoyl)-phthalocyanine.

*Example 8*

70 parts of 4-(m-nitrobenzoyl)-phthalic acid, 200 parts of urea, 11.2 parts of anhydrous cupric chloride and 4.2 parts of ammonium molybdate are ground together. The mixture, stirred in 560 parts of o-dichlorobenzene, is slowly heated to 143° C. and maintained thereat for 2½ hours. After cooling, the reaction product is filtered off and extracted successively with boiling ethanol, boiling water, hot 2N hydrochloric acid, hot 2N sodium hydroxide solution, and again with boiling water. The product is dried, extracted with boiling acetone and dried again. It is copper tetra-(4)-(m-nitrobenzoyl)-phthalocyanine. 41 parts thereof are dissolved in 410 parts of concentrated sulphuric acid at 5° C. The solution is filtered and gradually admitted into 4100 parts of water with strong agitation. The precipitated copper tetra-(4)-(m-nitrobenzoyl)-phthalocyanine is filtered off and the resulting paste washed with water until free from acid and inorganic salts.

Copper tetra-(4)-(m-nitrobenzoyl) - phthalocyanine, in the form of an aqueous paste obtained as described above and containing 35.1 parts of dry material, is milled and suspended in 470 parts of water. To the stirred mixture 179 parts of 30% aqueous sodium hydrogen sulphide solution are slowly added. The mixture is ground in a ball mill for 20 hours. The copper tetra-(4) - (m - aminobenzoyl) - phthalocyanine thereby produced is filtered off, washed with water until free from alkali and sulphide and dried.

*Example 9*

12 parts of 4-(p-nitrophenoxy)-phthalic acid, 36 parts of urea, 2 parts of anhydrous cupric chloride and 0.7 part of ammonium molybdate are mixed, finely powdered and heated at 145° C. for 3 hours. The cold, solid reaction product is powdered and extracted successively with boiling water, hot 2N sodium hydroxide solution, hot 2N hydrochloric acid and again with boiling water. It is then dried, extracted with boiling acetone and dried again. 5.5 parts of the copper tetra - (4)-(p-nitrophenoxy)-phthalocyanine so obtained are dissolved in 55 parts of concentrated sulphuric acid at 5° C. The green solution obtained is suffered to drip slowly into 550 parts of stirred cold water. The copper tetra-(4)-(p-nitrophenoxy)-phthalocyanine comes out of solution and is filtered off, and the resulting paste washed well with water until free from acid and inorganic salts.

Copper tetra-(4)-(p-nitrophenoxy)-phthalocyanine in the form of an aqueous paste, obtained as described above and containing 55 parts of dry material, is ground with 70 parts of water. 19 parts of concentrated hydrochloric acid, followed by a solution of 20 parts of stannous chloride dihydrate in 40 parts of water are added. The mixture is stirred at 20° C. for 16 hours and filtered. The copper tetra-(4)-(p-aminophenoxy)-phthalocyanine is washed with dilute hydrochloric acid until free from tin salts, washed with water until free from acid, digested with warm dilute ammonium hydroxide solution, filtered off, washed with water until free from alkali and dried.

It will be clear from the aforegoing disclosure that the new compounds of this invention may be represented by the following formula

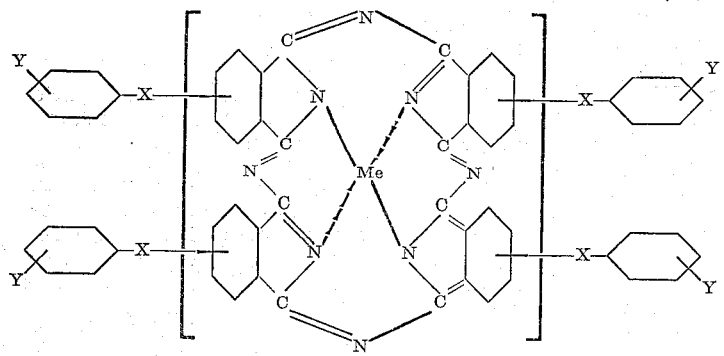

wherein Me represents a metal of the type hereinabove discussed; Y is a member of the group consisting of nitro and amino; while X designates a link selected from the group consisting of O, CO, and $SO_2$.

In the claims below, the expression "radical of a metal-phthalocyanine" shall be understood as referring to that portion of the molecule which is included in the brackets in the above formula; the expression "outer benzene radicals" shall be understood as referring to the benzene radicals shown outside the brackets in the above formula.

We claim:

1. Copper tetra-(4)-(p-aminobenzoyl)-phthalocyanine.

2. Copper tetra - (4) - (p - aminophenylsulphonyl)-phthalocyanine.

3. Copper tetra-(4)-(m-aminobenzoyl)phthalocyanine.

4. A compound of the general formula

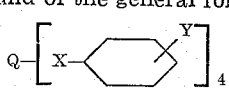

wherein Q stands for the radical of a metal-phthalocyanine whose metal has an atomic weight between 54 and 64, Y stands for a member selected from the group consisting of nitro and amino, while X designates a link selected from the group consisting of O, CO and $SO_2$.

5. A compound of the general formula

wherein Q stands for the radical of a metal-phthalocyanine whose metal has an atomic weight between 54 and 64, while X designates a link selected from the group consisting of O, CO and $SO_2$.

6. A tetra-benzoyl metal phthalocyanine whose metal has an atomic weight between 54 and 64 and in which the outer benzene radicals carry, by direct attachment, substituents selected from the group consisting of nitro and amino.

7. A tetra(benzene-sulfonyl)-metal phthalocyanine whose metal has an atomic weight between 54 and 64 and in which the outer benzene radicals carry, by direct attachment, substituents selected from the group consisting of nitro and amino.

8. Tetra(amino-benzoyl)-copper - phthalocyanine.

9. Tetra(amino - phenyl - sulfonyl) - copper - phthalocyanine.

10. In the process of manufacturing a compound as defined in claim 4, the step which consists of heating with urea and a metal-yielding agent, whose metal has an atomic weight between 54 and 64, a compound of the formula

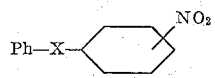

wherein X is a link selected from the group consisting of O, CO and $SO_2$, while Ph designates the radical of a member selected from the group consisting of phthalic acid, phthalic anhydride, phthalimide and phthalamide which carries said link X in the phenyl nucleus.

11. Process for the manufacture of a compound as defined in claim 5, which comprises heating with urea and a metal-yielding agent, whose metal has an atomic weight between 54 and 64, a compound of the formula

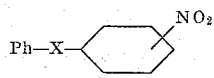

wherein X is a link selected from the group consisting of O, CO and $SO_2$, while Ph designates the radical of a member selected from the group consisting of phthalic acid, phthalic anhydride, phthalimide and phthalamide which carries said link X in the phenyl nucleus, and then subjecting the resulting tetranitro compound to reduction, to reduce the nitro groups to amino groups.

NORMAN HULTON HADDOCK.
ALEXANDER PARKINSON.
GEORGE ALSTON ROWE.